United States Patent [19]

Sutherland et al.

[11] Patent Number: 5,698,343
[45] Date of Patent: Dec. 16, 1997

[54] LASER WAVELENGTH DETECTION AND ENERGY DOSIMETRY BADGE

[75] Inventors: Richard L. Sutherland, Dayton; Lalgudi V. Natarajan, Beavercreek; Vincent P. Tondiglia, Dayton; Robert L. Crane, Kettering, all of Ohio

[73] Assignee: The United States of America as represented by the Secretary of the Air Force, Washington, D.C.

[21] Appl. No.: 672,312

[22] Filed: Jun. 28, 1996

Related U.S. Application Data

[63] Continuation-in-part of Ser. No. 273,437, Jul. 5, 1994, abandoned.

[51] Int. Cl.⁶ .................................................. G03H 1/04
[52] U.S. Cl. .................. 430/1; 430/2; 359/1; 359/3; 359/30; 250/482.1
[58] Field of Search ................... 250/482.1; 359/1, 359/3, 30; 430/1, 2, 290, 945

[56] References Cited

U.S. PATENT DOCUMENTS

| | | | |
|---|---|---|---|
| 4,560,249 | 12/1985 | Nishiwaki et al. | 359/3 |
| 4,857,425 | 8/1989 | Phillips | 359/30 |
| 5,096,282 | 3/1992 | Margerum et al. | 359/3 |
| 5,145,756 | 9/1992 | Windeln et al. | 430/2 |
| 5,227,859 | 7/1993 | Leib et al. | 556/347 |
| 5,272,550 | 12/1993 | Dickson et al. | 359/3 |

FOREIGN PATENT DOCUMENTS

| | | | |
|---|---|---|---|
| 544591 | 8/1952 | Canada | 359/1 |
| 61-90185 | 5/1985 | Japan | 430/1 |
| 61 90185 | 5/1986 | Japan | 430/1 |
| 2222696 | 3/1980 | United Kingdom | 359/1 |
| 2222696 | 3/1990 | United Kingdom | 359/1 |

OTHER PUBLICATIONS

Sutherland et al., "Bragg Gratings in an Acrylate . . .", Chem. Mater, No. 5, pp. 1533-38, (1993).
Sutherland et al., Electrically Switchable Volume Gratings in Polymer-Dispersed Liquid Crystals, Applied Physics Letters, vol. 64, No. 9, pp. 1074-1-76, 1994
Sutherland et al., Bragg Gratings in an Acrylate Polymer Consisting of Periodic Polymer-Dispersed Liquid-Crystal Planes, Chemistry of Materials, No. 5, pp. 1533-1538, 1993.
Stroke et al. *JOSA*, 57 p. 110 (1967).
Ingwall et al. "Hologram: Liquid crystal Composite" SPIE 1555 279-290 (1991).
Lackner et al. "Droplet Size . . ." SPIE 1080 53-61 (1989).
Domash "Applications of dynamic holograms . . ." SPIE 1773c 372-376 (1992).

*Primary Examiner*—Martin Angebranndt
*Attorney, Agent, or Firm*—Fredric L. Sinder; Thomas L. Kundert

[57] ABSTRACT

A new personal laser dosimetry badge records intentional or unintentional exposure to laser radiation. A Fresnel biprism is mounted over a layer of photopolymerizable material, preferably a polymer-dispersed liquid crystal material. A laser beam striking the apex of the biprism splits into two beams crossing at an angle which depends on the prism apex angle and the angle of incidence. These crossed beams form an interference pattern at the photopolymer with bright and dark fringes separated by a distance which depends on wavelength and the crossing angle of the two beams. The light triggers a photopolymerization reaction in the bright regions and records a permanent refractive index modulation, a hologram, which serves as a record of the laser interference pattern. Light incident normally on the badge will produce a normal index grating. Light incident at an angle will produce a slanted grating. An aperture at the front of the badge limits the irradiation area and the grating is recorded on the corresponding spot on the photopolymer determined by the badge geometry. The energy dosage of the laser can be determined from the peak diffraction efficiency of the resulting hologram.

20 Claims, 5 Drawing Sheets

PRIOR ART

LASER WAVELENGTH DETECTION AND ENERGY DOSIMETRY BADGE

This application is a continuation-in-part of application Ser. No. 08/273,437, filed on Jul. 5, 1994, now abandoned.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to dosimeters, and more specifically to a personal dosimeter for recording intentional or unintentional exposure to laser radiation.

Personnel on a battlefield, on test ranges and in the laboratory are often exposed to laser irradiation, either unintentionally or intentionally. It would be very useful to have a record of these irradiation events. A detector for recording these events should be able to discriminate coherent light (most often from a laser) sources from bright, noncoherent light sources. Such a detector should further be able to determine the wavelength of the incident laser radiation and the energy dose received from the irradiation.

To date, such laser discriminators, detectors and/or spectrometers exist, but only in very bulky forms that generally take up the space of a full optical bench. Unfortunately, there is currently no technology which will allow this combination detection, discrimination and energy dosage information in a small, passive package which can be worn by personnel in the form of a radiation badge.

It is, therefore, a principal object of the present invention to provide a personal dosimeter for recording intentional or unintentional exposure to laser irradiation.

It is another object of the present invention to provide a method for determining, from the recording, the wavelength of the incident laser radiation.

It is a further object of the present invention to provide a method for determining from the recording the energy dosage of the incident laser radiation.

It is a feature of the present invention that it is both small and passive and can be worn as a badge.

It is another feature of the present invention that its recordings can be read using conventional optical equipment and techniques.

It is a further feature of the present invention that it uses a unique photopolymerizable prepolymer syrup that can record in a single step holograms having an anisotropic spatial distribution of phase-separated liquid crystal droplets within a photochemically cured polymer matrix.

It is an advantage of the present invention that its recording is nearly immediate and requires no later development or further processing.

It is another advantage of the present invention that it is inexpensive and disposable.

These and other objects, features and advantages of the present invention will become apparent as the description of certain representative embodiments proceeds.

SUMMARY OF THE INVENTION

The present invention provides a small, passive, personal dosimeter badge for recording intentional or unintentional exposure to laser radiation. The unique discovery of the present invention is that a low profile prism, or Fresnel biprism, placed in optical contact with a photopolymerizable material will make a small, simple badge that splits an incident laser beam into two beams that will cross to record an interference pattern, or hologram, in the photopolymerizable material; and, that only coherent light, such as from a laser, will produce such an interference pattern which can be analyzed later to determine the wavelength and energy dosage of the incident laser radiation. Incoherent light, however bright, cannot record a hologram so that the invention very simply discriminates sources.

Another unique, and key, discovery of the present invention is that a photopolymerizable material can be made to expose only slowly over time and still record in a single step a readable interference pattern in a sufficiently short time so that it can be used as part of a small, simple and practical laser detection badge made according to the teachings of the present invention.

Accordingly, the present invention is directed to a method for detecting for the transient presence of laser or other coherent radiation, comprising the steps of providing an apparatus for making a hologram only when the hologram-making apparatus is irradiated with coherent radiation, placing for a period of time the hologram-making apparatus at a location for which detection of the transient presence of coherent radiation is desired and at the end of the period of time, ascertaining whether a hologram has been made by the hologram-making apparatus as a determination of whether it was irradiated by laser radiation. The hologram-making apparatus may comprise a beam splitter for splitting incident coherent radiation into two intersecting beams and a layer of photopolymerizable material in optical contact with the beam splitter so that the intersecting beams intersect inside the layer to form an interference pattern. The hologram-making apparatus may also comprise a prism and a layer of photopolymerizable material in optical contact with a face of the prism. The prism may be a Fresnel biprism. The layer of photopolymerizable material may comprise polymer-dispersed liquid crystals. The polymer-dispersed liquid crystals may comprise a homogeneous mixture of the monomer dipentaerythritol hydroxypentacrylate, a liquid crystal, a cross-linking monomer, a coinitiator, and a photoinitiator dye. The polymer-dispersed liquid crystals may also comprise a homogeneous mixture of the monomer dipentaerythritol hydroxypentacrylate, ~10–40 wt % of the liquid crystal E7, the cross-linking monomer N-vinylpyrrolidone, coinitiator N-phenylglycine, and a photoinitiator dye. The photoinitiator dye may be Rose Bengal. The method may include the step of determining from the geometry of a hologram made in the layer of photopolymerizable material the wavelength of the coherent radiation that exposed the photopolymerizable material to make the hologram. The method may also include the step of determining from the peak diffraction efficiency of a hologram made in the layer of photopolymerizable material the energy dosage of the coherent radiation that exposed the photopolymerizable material to make the hologram.

The present invention is also directed to a personal laser dosimetry badge, comprising a prism and a layer of photopolymerizable material in optical contact with the prism. The prism may be a Fresnel biprism. The layer of photopolymerizable material may comprises polymer-dispersed liquid crystals. The polymer-dispersed liquid crystals may comprise a homogeneous mixture of the monomer dipentaerythritol hydroxypentacrylate, a liquid crystal, a cross-linking monomer, a coinitiator, and a photoinitiator dye. The polymer-dispersed liquid crystals may also comprise a homogeneous mixture of the monomer dipentaerythritol hydroxypentacrylate, ~10–40 wt % of the liquid crystal E7, the cross-linking monomer N-vinylpyrrolidone, coinitiator N-phenylglycine, and a photoinitiator dye.

DESCRIPTION OF THE DRAWINGS

The present invention will be more clearly understood from a reading of the following detailed description in conjunction with the accompanying drawings wherein.

DETAILED DESCRIPTION

Figure 1:
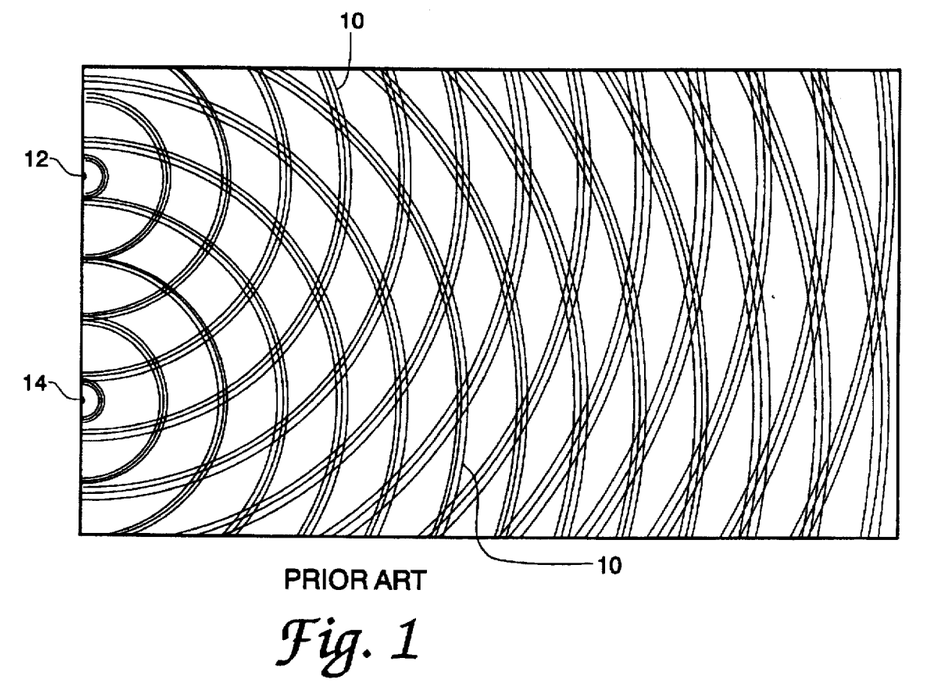
FIG. 1 is a simplified diagram of a classic prior art interference pattern made from overlapping waves of light from two pinholes.

Referring now to FIG. 1 of the drawings, there is shown a simplified diagram of a classic prior art interference pattern made from overlapping waves, or wavefronts, 10 of light from two pinholes 12 and 14. Where waves 10 of the same phase intercept, the waves reinforce to produce a region of higher energy. Where waves 10 of opposite phase intercept, they produce a region of lower, and possibly zero, energy. The resulting pattern, as can be seen by placing the eye near the left edge of the drawing and sighting at a grazing angle along the figure, is that of dark outwardly radiating lines. FIG. 1 is copied from a classic drawing made by Thomas Young in an 1803 paper. The experimental demonstration of such interference effects for light by Thomas Young in 1801 first established the wave theory of light on a firm experimental basis.

Figure 2:
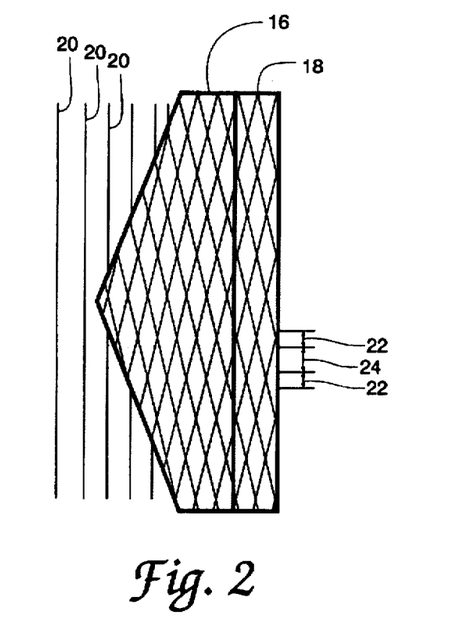
FIG. 2 is a simplified diagram of the interference pattern made from incident laser radiation on a Fresnel biprism in optical contact with a transparent film layer in accordance with the teachings of the present invention.

FIG. 2 is a simplified diagram of an interference pattern made from incident laser radiation on a low profile prism, or Fresnel biprism, 16 in optical contact with a film layer 18 in accordance with the teachings of the present invention. Unlike the expanding wavefronts of light from noncoherent light, wavefronts 20 of coherent light do not expand and may be treated as being straight. Wavefronts 20 are bent by refraction as they pass through the interfaces between the air and the two front faces of biprism 16 so that they produce an interference pattern very similar to the classic pattern first shown by Thomas Young. Wavefronts 20 in this figure are shown as being parallel to the backface of biprism 16 and produce an interference pattern of reinforced bright lines or regions 22 and interfering or canceled dark lines or regions 24 through film layer 18 normal to the surfaces of the film layer. Wavefronts 20 approaching the lower half of biprism 16 are bent back up to the left as they enter biprism 16 and wavefronts 20 approaching the upper half of biprism 16 are similarly bent back down to the left as they enter biprism 16. Simple inspection of the figure will show that if wavefronts 20 approach biprism 16 at an angle, the interference pattern of light and dark lines inside film layer 18 will be at an angle to the surfaces of the film.

If film layer 18 is made of an appropriate photosensitive polymer material, the interference pattern of light and dark lines can be fixed to make a volume hologram in which the light and dark lines are regions of varying, or modulated, refractive index. The lines are regions of peak refractive index where, for example, the photosensitive polymer has more fully cured, and produce a transmission grating through the material.

Figure 3:
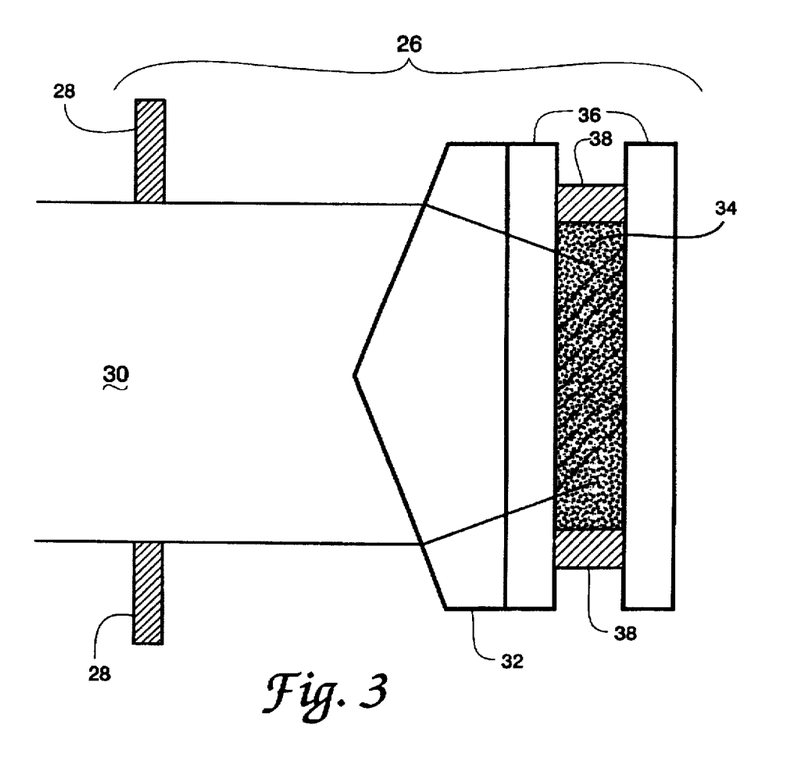
FIG. 3 is a simplified side view of a personal dosimeter, or laser badge, made according to the teachings of the present invention showing the development of a hologram, or transmission phase grating, in a photosensitive layer of polymer-dispersed liquid crystals (PDLCs)

FIG. 3 is a simplified side view of a personal dosimeter or laser badge 26 made according to the teachings of the present invention. An aperture screen or mask 28 limits the width of a possible incident laser beam 30. Mask 28 is mounted in front of a low profile Fresnel biprism 32. A layer 34 of photopolymerizable material is sandwiched between a pair of glass slides 36 and spacers 38. Layer 34 is placed in optical contact with the base of prism 32 using conventional optical index matching liquids.

During any transient period in which a laser beam 30 is incident on badge 26, an interference pattern will be formed inside photopolymerizable layer 34. The bright regions of the pattern will trigger a photopolymerization reaction in those regions and record a permanent refractive index modulation, that is, a hologram, as a record of the laser interference pattern. The hologram produced by the present invention is a transmission grating consisting of periodic planes of polymer-dispersed liquid crystals. The photopolymer used must provide a very fast recording speed for the hologram to avoid smearing of the grating, and must produce a measurable diffraction efficiency in that short time to successfully record low laser intensities. These requirements are further complicated by the requirement that the photopolymer not be too sensitive so that it doesn't completely polymerize, or bleach out, from ambient light in such a short time as to make its use in a personal dosimeter impractical.

A key realization leading to the present invention was that some possible photoinitiators for photopolymerizable materials are not immediately completely consumed, but can remain available for triggering separate photopolymerizations over time. The prior art has been chiefly concerned with using relatively long continuous exposures for photopolymerizable materials used for making holograms in an manufacturing environment. As such, the prior art has not recognized the possibility of using a photopolymerizable material specially made or chosen for the seemingly inconsistent properties of very fast recording speeds and low light sensitivity in a laser badge.

The advantage of a low profile prism, such as a Fresnel biprism, over wider angle prisms is that they will have a wider angle output and thus will produce large spaced gratings which are less susceptible to smearing.

The inventors have discovered as a preferred photopolymerizable material, or photopolymer system, for use with the subject invention a unique formulation for polymer-dispersed liquid crystals (PDLCs). PDLCs are formed from a homogeneous mixture of polymerizable monomer (prepolymer) and liquid crystals. As the polymer cures, the chemical potential of the system changes, increasing the miscibility gap between the liquid crystal and its host. The liquid crystals therefore separate out as a distinct micro-droplet phase. If the prepolymer is a photopolymer, this phase separation of the liquid crystals, or second phase material, from their host occurs as the prepolymer is optically radiated with light. The phase separated liquid crystals dramatically enhance the diffraction efficiency of the recorded gratings. The preferred photopolymer system is more fully described in copending U.S. patent application Ser. No. 08/273,436, by Sutherland et al., titled "Switchable Volume Hologram Materials and Devices;" and also in R. L. Sutherland et al., "Bragg Gratings in an Acrylate Polymer Consisting of Periodic Polymer-Dispersed Liquid-Crystal Planes," *Chemistry of Materials*, No. 5, pp. 1533–1538 (1993); R. L. Sutherland et al., "Electrically switchable volume gratings in polymer-dispersed liquid crystals," *Applied Physics Letters*, Vol. 64, No. 9, pp. 1074–1076 (1994); and, T. J. Bunning et al., "The Morphology and Performance of Holographic Transmission Gratings Recorded in Polymer Dispersed Liquid Crystals," *Polymer*, Vol. 36, No. 14, pp. 2699–2708 (1995), all of which are fully incorporated by reference into this Detailed Description.

The process by which the hologram is formed is controlled primarily by the recipe components of the homogeneous starting mixture, and to a lesser extent by the intensity of the incident light pattern. The preferred polymer dispersed liquid crystal material creates a switchable hologram in a single step. A new feature of the preferred PDLC material is that illumination by an inhomogeneous, coherent light pattern initiates a patterned, anisotropic diffusion (or counterdiffusion) of polymerizable monomer and second phase material, particularly LC for this application, to produce in a single-step process alternating well-defined channels of second phase-rich material separated by well-defined channels of nearly pure polymer. The resulting preferred PDLC material, when exposed by coherent radiation as part of its use with a laser badge made according to the teachings of the present invention, has an anisotropic spatial distribution of phase-separated LC droplets within the photochemically cured polymer and matrix. Prior art PDLC materials made by a single-step process can achieve at best only regions of larger LC bubbles and smaller LC bubbles in a polymer matrix. The large bubble sizes are highly scattering which produces a hazy appearance and multiple order diffractions, not the well-defined only first order diffraction and zero order diffraction made possible by the small LC bubbles of the preferred PDLC material in well-defined channels of LC-rich material. Reasonably well-defined alternately LC-rich channels and nearly pure polymer channels in a PDLC material are possible by multi-step processes, but such processes are by their very nature unsuitable for use in a laser detection badge. Further, such multi-step prior art processes do not achieve the precise morphology control over LC droplet size, distribution of sizes and widths of the polymer and LC-rich channels made possible by the preferred PDLC material.

The preferred polymer-dispersed liquid crystal material has as its prepolymer syrup a homogeneous mixture of a polymerizable monomer comprising primarily dipentaerythritol hydroxypentacrylate, ~10–40 wt % of the liquid crystal E7, the chain-extending monomer N-vinylpyrrolidone, coinitiator N-phenylglycine, and the photoinitiator dye rose bengal ester. The monomer dipentaerythritol hydroxypentacrylate is available from Polysciences, Inc., Warrington, Pa. The liquid crystal E7 is a mixture of cyanobiphenyls marketed as E7 by Merck and is also available from BDH Chemicals, Ltd., London, England. The chain-extending monomer and the coinitiator are available from Aldrich Chemical Company, Milwaukee, Wis. The photoinitiator rose bengal ester (2,4,5,7-tetraiodo-3', 4',5',6'-tetrachlorofluroescein-6-acetate ester) is marketed as RBAX by Spectragraph, Ltd., Maumee, Ohio. It is also available as rose bengal sodium salt (which must be esterfied for solubility) from Aldrich Chemical Company. This system has a very fast curing speed which results in very small liquid crystal micro-droplets. The mixture of liquid crystal and prepolymer syrup are homogenized to a viscous solution by ultrasonification and spread between glass slides with spacers of nominally 15–100 μm thickness.

In one test of the present invention, the photopolymer mixture was a solution of the monomer dipentaerythritol hydroxypentacrylate, 17.3 wt % of the liquid crystal E7, 7 wt % of the chain-extending (or cross-linking) monomer N-vinylpyrrolidone, 1.7 wt % of the coinitiator N-phenylglycine, and 0.1 wt % of the photoinitiator dye rose bengal. A sample apparatus, using both 60° and 90° prisms, was irradiated with the 488 nm line of an Argon ion laser. Diffraction gratings were confirmed by probing, as will be described later in this Detailed Description, with a HeNe laser (632.8 nm) as a function of angle of incidence. A grating efficiency as high as 65% was observed. Bragg gratings could be detected for exposure at 488 nm of 1 mW for 250 msec. The sensitivity of the starting syrup to light intensity is dependent on the photoinitiator dye and its concentration. A higher dye concentration leads to a higher sensitivity. In most cases, the solubility of the photoinitiator limits the concentration of the dye and thus the sensitivity of the monomer syrup. For more general applications than the present invention, concentrations in the range of 0.2–04 wt % for most good photoinitiators are sufficient to achieve desirable sensitivities and allow for a complete bleaching of the dye in the recording process, resulting in colorless final samples.

In order to detect for a wide spectrum of light, more than one photoinitiator dye will be needed. A combination of rose bengal and methylene blue dyes is sufficient to cover the entire visible spectrum. Other suitable dyes and dye coinitiator combinations, particularly for visible light, include: eosin y and triethanolamine; camphor quinone and N-phenylglycine; fluorescein and triethanol amine; methylene blue and triethanol amine or N-phenylglycine; erythrosin B and triethanol amine; indolinocarbocyanine and triphenyl borate; and, iodobenzospiropyran and triethylamine. Possible photoinitiators also include eosin, eosin sodium salt, 4,5-diiodosuccinyl fluorescein, camphor quinone and methylene blue. These dyes show a sensitivity to recording wavelengths across the visible spectrum from nominally 400 nm to 700 nm. Potential near infrared dyes include cationic cyanine dyes with trialkylborate anions having absorption from 600–900 nm as well as merocyanine dyes derived from spiropyran.

The polymerizable monomer and the second phase material (such as liquid crystal) must be completely miscible. Highly functionalized monomers (such as penta-acrylates) are desired for two reasons. First, on polymerization they can form densely cross-linked networks which shrink to some extent and tend to squeeze out the second phase material. This is important to the process of demixing, that is, controllably moving the second phase material anisotropically out of the polymer region to then separate in well-defined polymer-poor, second phase-rich channels. Second, the extensive cross-linking associated with these monomers yields fast kinetics, so the hologram forms relatively quickly, and the second phase material tends to be formed in very small microdomains (< or ~0.1 µm). However, highly functionalized monomers are very viscous and will not tend to form very good mixtures with other materials. They are also very difficult to spread into thin films. Therefore, a mixture of tri- and penta-acrylates is required to optimize the functionality and viscosity. An approximately 1:4 mixture of tri- to penta-acrylate (triethyleneglycol diacrylate, trimethylol propanetriacrylate, pentaerythritol triacrylate, pentaerythritol tetracrylate and pentaerythritol pentacrylate) allows a homogeneous mixing of all of the components as well as a good working fluid for forming thin films (~10–20 µm thick).

The second phase material of choice for the present invention is a liquid crystal. This also allows an electrooptical response for the resulting hologram, that is, the resulting hologram may be switched by the application of an electric field. This feature is not required for a laser detection badge, in that only that a hologram can be formed is needed to show the presence of coherent radiation. Therefore, other second phase materials could be used for the present invention. At the present time, liquid crystals perform better than other possible second phase materials. The concentration of LC must be large enough to allow a significant phase separation in the cured sample, but not so large as to make the sample opaque or very hazy. Below 20% by weight very little phase separation occurs and diffraction efficiencies are low. Above 35% by weight, the sample becomes highly scattering, reducing both diffraction efficiency and transmission. Samples fabricated with ~25% by weight yield good diffraction efficiency and optical clarity. The concentration of LC may be increased to 35% by weight without loss in optical performance by adjusting other components of the prepolymer syrup, most notably a surfactant. Potential LCs include the mixture of cyanobiphenyls marketed as E7 by Merck, 4'-n-pentyl-4-cyanobiphenyl, 4'-n-heptyl-4-cyanobiphenyl, octa oxy cyano biphenyl, pentyl cyano terphenyl and 4-methoxybenzylidene-4'-butylaniline. Other second phase components are also possible.

The co-initiator controls the rate of curing in the free radical polymerization reaction. For optimum phase separation in more general applications, which is dependent on the curing rate, a co-initiator in the range of 2–3% by weight gives the best performance in terms of diffraction efficiency. Potential coinitiators include N-phenyl glyceine, triethylene amine triethanol amine and N,N-dimethyl-2,6-diisopropyl aniline.

The chain extender (or cross-linker) helps to increase the solubility of the components in the prepolymer syrup as well as increase the speed of polymerization. The chain extender is a much smaller size vinyl monomer compared to the penta-acrylate, and is thereby able to attach to the acrylate positions in the penta-acrylate monomer, which are not easily accessible to neighboring penta-acrylate monomers due to steric hindrance. Thus, the attachment of the chain extender monomer increases the propagation length of the growing polymer and results in high molecular weights. For more general applications, the range of 10–18% by weight of chain extender maximizes the performance in terms of diffraction efficiency. Potential chain extenders include N-vinyl pyrrolidone, N-vinyl pyridine, acrylo nitrile and N-vinyl carbazole.

For more general applications, addition of as low as 5 wt % of a surfactant exhibit a significant reduction in switching voltage. When optimizing for low switching voltages, the concentration of surfactant may vary up to 10% by weight (mostly dependent on LC concentration), after which there is a large decrease in diffraction efficiency, as well as an increase in switching voltage (possibly due to a reduction in total phase separation of LC). Potential surfactants include octanoic acid, heptanoic acid, hexanoic acid, dodecanoic acid and decanoic acid.

Figure 4:
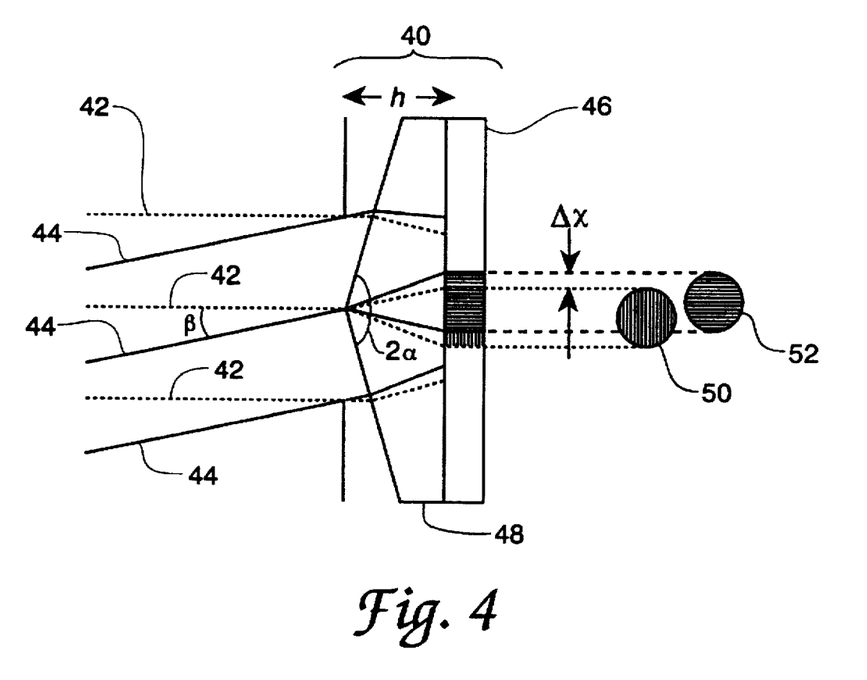
FIG. 4 is a simplified diagram of a laser badge according to the teachings of the present invention illustrating an example method for determining the wavelength of an incident laser beam that recorded a hologram in a photosensitive polymer layer.

FIG. 4 is a simplified diagram of a laser badge 40 according to the teachings of the present invention illustrating an example method for determining the wavelength of incident laser beams 42 or 44 that recorded a hologram in a photosensitive film layer 46. FIG. 4 illustrates the geometry of laser badge 40. Lines 40 indicate light at normal incidence. Lines 42 indicate light incident at an angle D as shown in the figure. Prism 48 bends light from the upper and lower portions of the prism in opposite directions. The regions where these overlap in the back plane of the prism defines a spot 50 or 52 where a hologram is recorded. For light at normal incidence, the centroid of spot 50 is on the axis of the prism, directly below the apex of the prism. The centroid of the overlap spot 52 for an off-axis beam 44 is displaced by a distance Δx from this axis. A formula for this displacement is given as follows:

$$\Delta x = \frac{h}{2} \left\{ \frac{\cos(\alpha - \beta)}{[n^2 - \cos^2(\alpha - \beta)]^{\frac{1}{2}}} - \frac{\cos(\alpha + \beta)}{[n^2 - \cos^2(\alpha + \beta)]^{1/2}} \right\}$$

where h is the height of prism 48, n is its index of refraction, and $2\alpha$ is the apex angle. The parameters h, n, and $\alpha$ are known, while Δx would be measured. The formula can be solved numerically then to find $\beta$.

For example, assume that a measurement yields Δx=h/2. Then with $2\alpha=160°$ and n=1.5, a calculation yields $\beta=42.2°$. This calculation was done using the "root" function in Mathcad 3.1 on a Macintosh IIsi and takes less than 1 second to perform.

Figure 5:
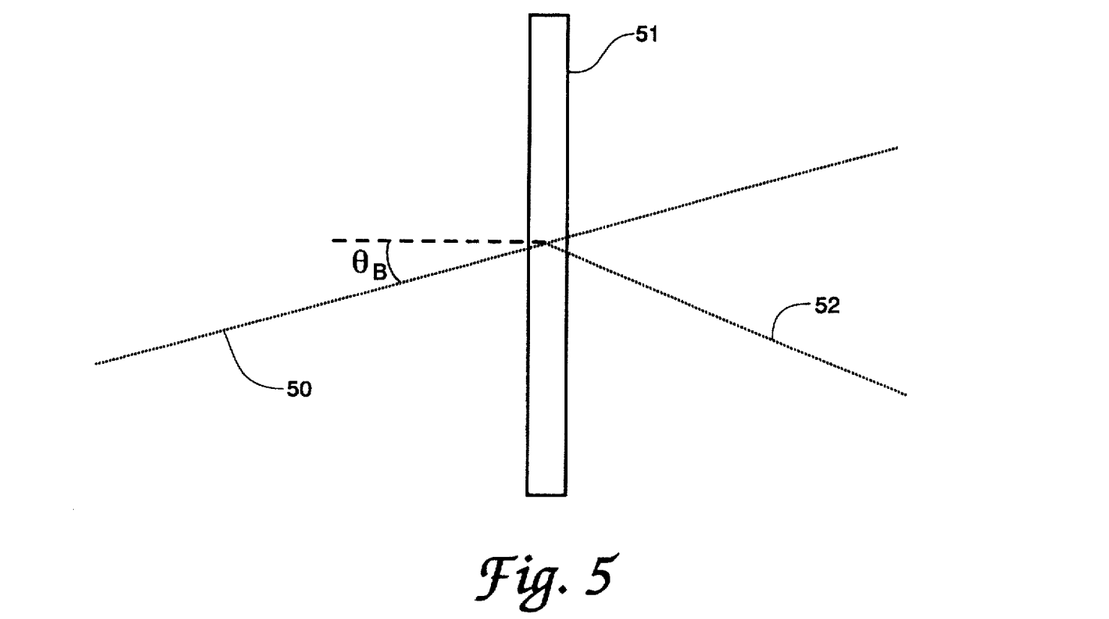
FIG. 5 is a simplified diagram of an apparatus for measuring the Bragg angle and diffraction efficiency of an photosensitive layer exposed to form a holographic grating in the Bragg regime according to the teachings of the present invention.

Once the angle $\beta$ is known, one can proceed to determine the unknown wavelength $\lambda$ of the laser which recorded the holographic grating. A simple experimental situation is depicted in FIG. 5. A probe laser beam 50 of wavelength $\lambda_p$ irradiates a sample 51 as a function of angle of incidence. When the angle of incidence is equal to an angle called the Bragg angle, $\theta_B$, there will be a strong diffracted beam 52. The sample is rotated until this condition is found and then the Bragg angle is measured.

If the angle $\beta \neq 0$, then the grating planes will be slanted by an angle $\theta_s$, where $$\theta_s = \frac{1}{2} \left\{ \sin^{-1}\left[\frac{\cos(\alpha - \beta)}{n}\right] - \sin^{-1}\left[\frac{\cos(\alpha + \beta)}{n}\right] \right\}$$

and can thus be computed in terms of known quantities. The unknown wavelength is then found from the following equation:

$$\lambda = \frac{\cos\left\{ \alpha + \frac{1}{2} [\sin^{-1}\{n^{-1}\cos(\alpha - \beta)\} + \sin^{-1}\{n^{-1}\cos(\alpha + \beta)\}] \right\}}{\sin[\theta_s + \sin^{-1}(n^{-1}\sin\theta_B)]} \lambda_p$$

For example, suppose one finds that $\beta=5°$ and measures $\theta_B=3°$. Then using the values of other parameters as defined, $\theta_s=3.3°$. If the probe laser is a HeNe laser with a wavelength of 632.8 nm, then the equation yields 402.2 nm for the unknown wavelength.

Figure 6:
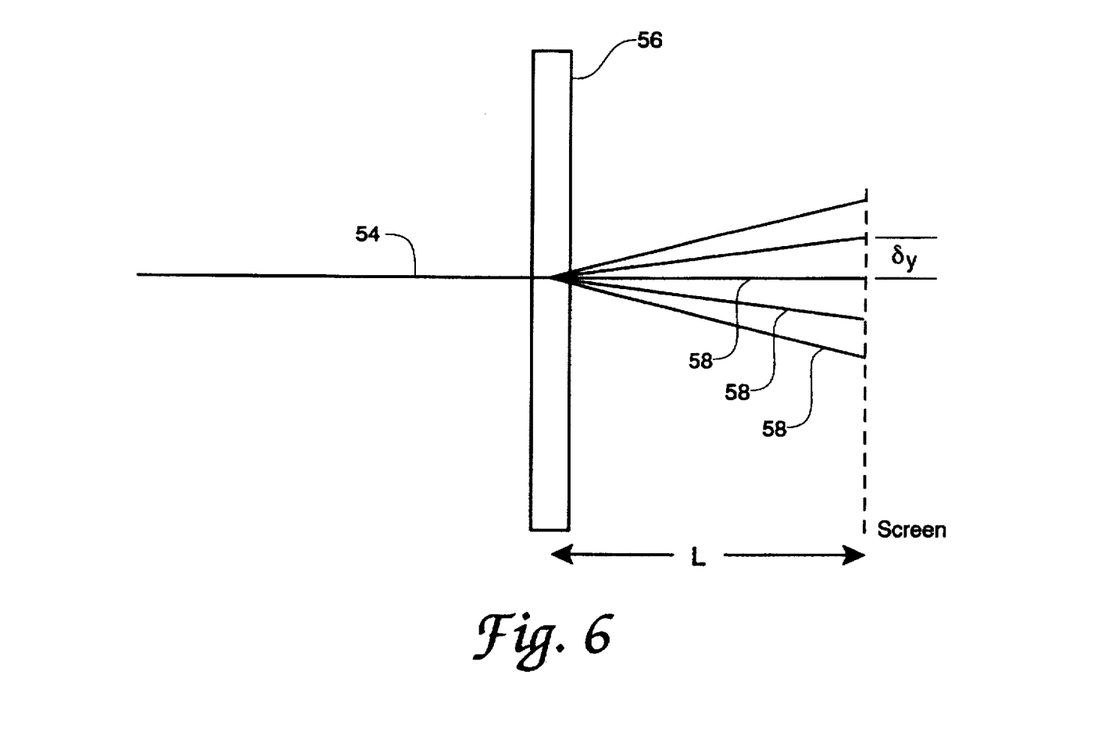
FIG. 6 is a simplified diagram of an apparatus for measuring the multiple order diffraction of a probe beam through a photosensitive layer exposed to form a holographic grating in the Raman-Nath regime according to the teachings of the present invention.

An alternative method of analysis occurs when the prism is very flat. In this case, the holographic grating may operate in a regime known as the Raman-Nath approximation. In this situation, shown in FIG. 6, instead of measuring the Bragg angle, which may be very small, a probe laser beam 54 can be directed at a sample 56 at normal incidence. The transmitted light will display a multitude of diffracted orders 58 symmetrically distributed about the zero-order directly transmitted beam. At a convenient distance L away from the sample, the distance $\delta_y$ between the spots corresponding to adjacent diffracted orders can easily be measured. The unknown wavelength would then be computed using the following formula:

$$\lambda = 2\cos\left\{ \alpha + \frac{1}{2} [\sin^{-1}\{n^{-1}\cos(\alpha - \beta)\} + \sin^{-1}\{n^{-1}\cos(\alpha + \beta)\}] \right\} \frac{\delta_y}{L} \cos\theta_s \lambda_p$$

Figure 7:
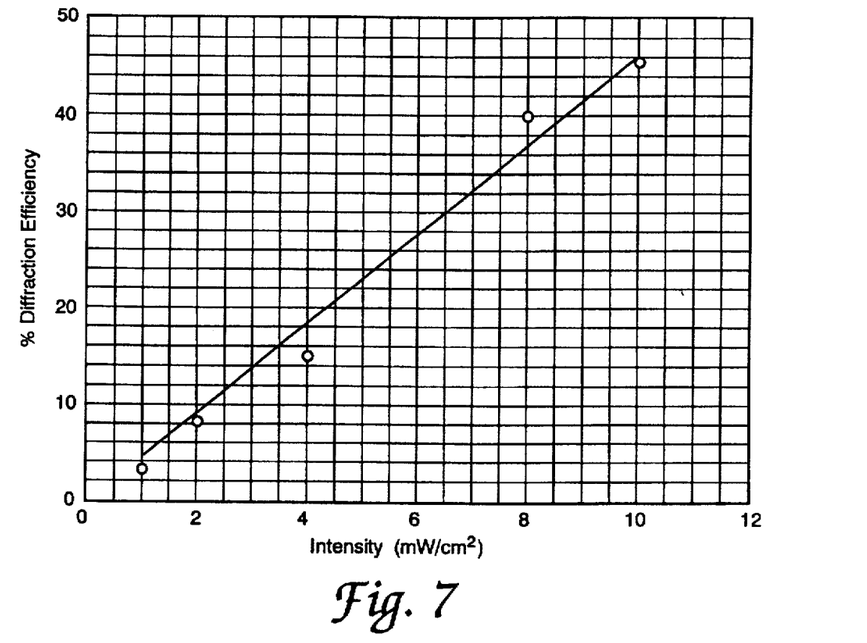
FIG. 7 is a graph of peak diffraction efficiency versus intensity of an incident laser beam for a sample photosensitive layer exposed to form a holographic grating in the Bragg regime according to the teachings of the present invention.
Figure 8:
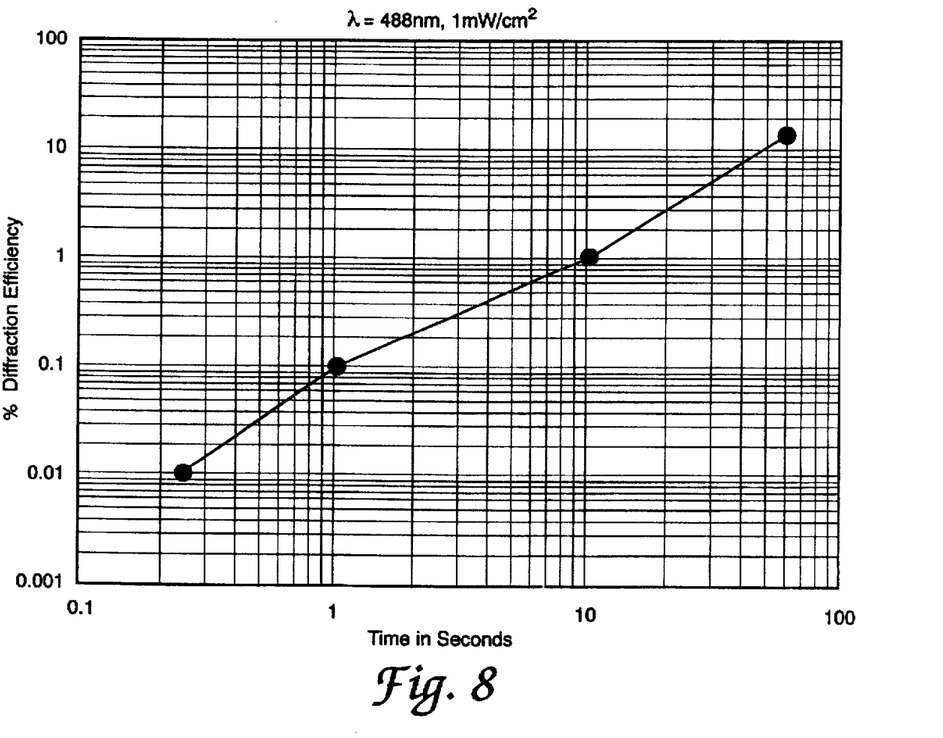
FIG. 8 is a graph of the variation of diffraction efficiency over time for a constant recording laser intensity; and, FIG. 9 is a simplified view of a the back of a personal dosimeter, or laser badge, made according to the teachings of the present invention showing a fastener for attaching the personal dosimeter to an article of clothing or other object.

FIG. 7 shows how the peak diffraction efficiency for a holographic grating in the Bragg regime, made in accordance with the teachings of the present invention, varies with the intensity of an incident laser beam. FIG. 8 shows the variation of diffraction efficiency with time for a constant laser intensity during recording. These graphs demonstrate that the peak diffraction efficiency for a particular recording wavelength can be used as a measure of laser energy dosage.

FIG. 8 also shows that a measurable grating can be recorded in an exposure time as short as 250 ms.

Figure 9:
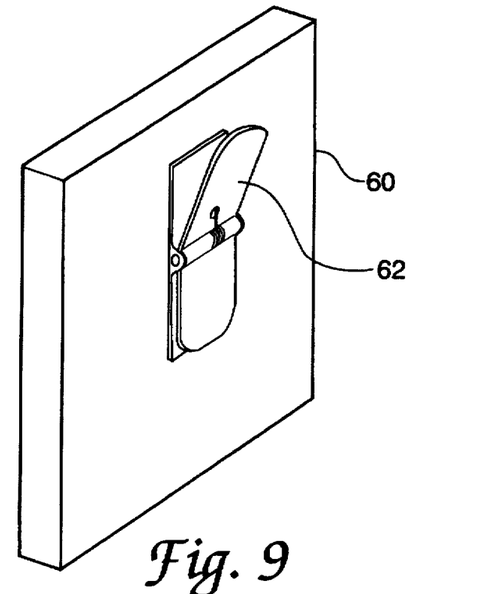

FIG. 9 is a simplified view of the back of a laser badge 60 and a fastener 62 for attaching badge 60 to clothing or other objects. Fastener 62 is representative of any attachment device and may be a pin, a clip, a clasp, a hook or any of a variety of well-known fasteners for attaching a badge to clothing or apparatus.

Figure 10:
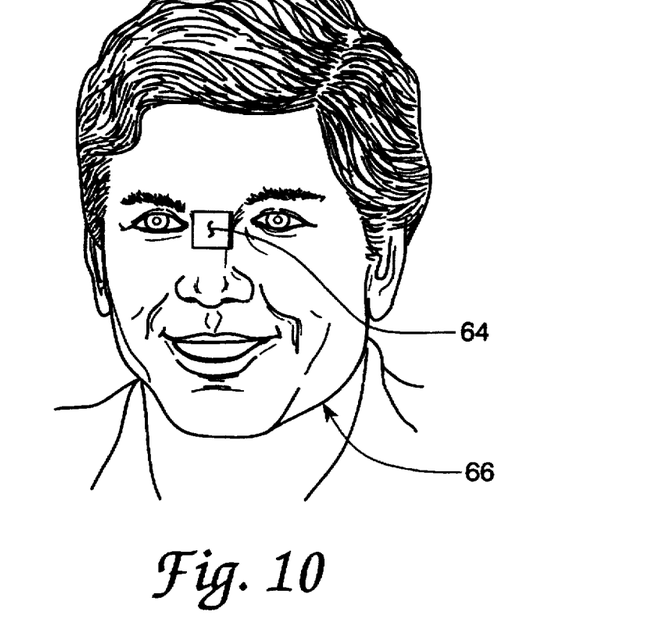
FIG. 10 is a simplified view of a personal dosimeter, or laser badge, made according to the teachings of the present invention showing a preferred mounting location between the eyes of a person; and, FIG. 11 is a simplified view of a personal dosimeter, or laser badge, made according to the teachings of the present invention showing the addition of a hemispherical cover lens.

FIG. 10 is a simplified view of a laser badge 64 shown mounted between the eyes of a person 66. The mounting may be by a variety of means known to those with skill in the art of the invention, and typically not clip 62 as shown in FIG. 9. This mounting position maximizes the relationship between a positive reading for coherent light and the actual risk to the person. This mounting position also helps maintain a preferred temperature range of 77°–78° F. for the photo-polymerizable material.

Figure 11:
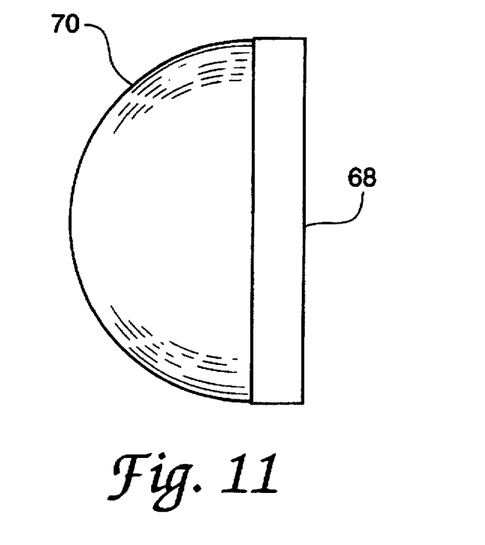

FIG. 11 is a simplified view of a laser badge 68 showing the addition of a hemispherical cover lens 70 for collecting light from a wider field of view. Those with skill in the art of the invention will see other possible cover lens configurations, of both converging and diverging lenses, for increasing the field of view of the invention.

As previously described, the photopolymer used for a badge must not be too sensitive so that it does not completely polymerize, or bleach out, from ambient light in such a short time as to make its use in a personal dosimeter impractical. The described preferred polymer-dispersed liquid crystal material can completely cure in one hour of bright sunlight. In such bright conditions, an UV filter, a banded filter, or both, may be used to extend the period of time the laser badge is usable. A particular advantage of the present invention is that it can still record a readable hologram as long as some photopolymer remains unconsumed. An image can be fixed by fully consuming the photopolymer, after laser exposure, by irradiating with a bright white light. This also prevents an unintended forming of another hologram from other laser sources.

Those with skill in the art of the invention will readily see that the laser badge concept of detecting for the transient presence of coherent or laser light is not limited to the disclosed preferred embodiment of a low profile badge, but can include any hologram-making apparatus that will form a hologram only in the presence of coherent radiation. Similarly, the invention is not limited to the use of a prism as a beam splitter for making a holographic transmission grating, but any beam splitting apparatus may be used.

The disclosed personal laser dosimetry badge and method for using successfully demonstrates the advantages of using a compact hologram-making apparatus as a tester for the presence of the laser or other coherent radiation needed to make a hologram. Although the disclosed laser dosimetry badge is specialized, its teachings will find application in other areas where dosimeters, or any compact testing apparatus, are needed.

In the claims, the term polymer-dispersed liquid crystals includes, as may be appropriate, solutions in which none of the monomer's have yet polymerized or cured, solutions in which some polymerization has occurred, and solutions which have completely polymerized. Those with skill in the art of the invention will clearly understand when the standard term used in the art, polymer-dispersed liquid crystals, which grammatically refers to liquid crystals dispersed in a fully polymerized matrix, is meant to include all or part of a more grammatically correct prepolymer-dispersed liquid crystal material or a more grammatically correct starting material for a polymer-dispersed liquid crystal material.

Those of ordinary skill in the art of the invention will also understand that the term "in optical contact" means in actual physical contact with an index matching interface, if needed, therebetween.

It will be seen by those with skill in the field of the invention that certain modifications may be made to the invention. For example, it has been found advantageous to place a small mask in front of the apex of the prism because the discontinuity at the apex can affect the grating, making reading more difficult. Other modifications to the invention as described may be made, as might occur to one with skill in the field of the invention, within the intended scope of the claims. Therefore, all embodiments contemplated have not been shown in complete detail. Other embodiments may be developed without departing from the spirit of the invention or from the scope of the claims.

We claim:

1. A method for detecting for the transient presence of laser or other coherent radiation, comprising the steps of:
   (a) providing a badge, the badge including:
      (i) an apparatus for making a hologram only when the hologram-making apparatus is irradiated with coherent radiation; and,
      (ii) a fastener for attaching the badge to an object;

(b) attaching for a period of time the badge to an object at a location for which detection of the transient presence of coherent radiation is desired; and, (c) at the end of the period of time, ascertaining whether a hologram has been made by the hologram-making apparatus as a determination of whether it was irradiated by laser radiation.

2. The method for detecting for the transient presence of laser or other coherent radiation according to claim 1, wherein the hologram-making apparatus comprises:

(a) a beam splitter for splitting incident coherent radiation into two intersecting beams; and, (b) a layer of photopolymerizable material in optical contact with the beam splitter so that the intersecting beams intersect inside the layer to form an interference pattern.

3. The method for detecting for the transient presence of laser or other coherent radiation according to claim 1, wherein the hologram-making apparatus comprises:

(a) a prism; and, (b) a layer of photopolymerizable material in optical contact with a face of the prism.

4. The method for detecting for the transient presence of laser or other coherent radiation according to claim 3, wherein the prism is a Fresnel biprism.

5. The method for detecting for the transient presence of laser or other coherent radiation according to claim 3, wherein the layer of photopolymerizable material comprises a layer of photopolymerizable polymer-dispersed liquid crystal material.

6. The method for detecting for the transient presence of laser or other coherent radiation according to claim 5, wherein the layer of polymer-dispersed liquid crystal material comprises a homogeneous mixture of a monomer comprising primarily dipentaerythritol hydroxypentacrylate, a liquid crystal, a chain-extender monomer, a coinitiator, and a photoinitiator dye.

7. The method for detecting for the transient presence of laser or other coherent radiation according to claim 5, wherein the layer of polymer-dispersed liquid crystal material comprises a homogeneous mixture of a monomer comprising primarily dipentaerythritol hydroxypentacrylate, 10–40 wt % of the liquid crystal E7, chain-extender monomer N-vinylpyrrolidone, coinitiator N-phenylglycine, and a photoinitiator dye.

8. The method for detecting for the transient presence of laser or other coherent radiation according to claim 7, wherein the photoinitiator dye is rose bengal.

9. The method for detecting for the transient presence of laser or other coherent radiation according to claim 5, further comprising the step of determining from the geometry of a hologram made in the layer of photopolymerizable polymer-dispersed liquid crystal material the wavelength of the coherent radiation that exposed the photopolymerizable material to make the hologram.

10. The method for detecting for the transient presence of laser or other coherent radiation according to claim 5, further comprising the step of determining from the peak diffraction efficiency of a hologram made in the layer of photopolymerizable polymer-dispersed liquid crystal material the energy dosage of the coherent radiation that exposed the photopolymerizable material to make the hologram.

11. The method for detecting for the transient presence of laser or other coherent radiation according to claim 5, wherein the prism is a Fresnel biprism.

12. The method for detecting for the transient presence of laser or other coherent radiation according to claim 1, wherein the step of fastening the badge to an object at a location for which detection of the transient presence of coherent radiation is desired comprises fastening the badge on an object located between the eyes of a living being.

13. A personal laser dosimeter, comprising a badge, the badge including:

(a) a prism;

(b) a layer of photopolymerizable material in optical contact with the prism; and, (c) a fastener for attaching the badge to an object.

14. The personal laser dosimetry badge according to claim 13, wherein the prism is a Fresnel biprism.

15. The personal laser dosimeter according to claim 13, wherein the prism has an apex, further comprising a hemispherical lens mounted over the apex of the prism.

16. The personal laser dosimetry badge according to claim 13, wherein the layer of photopolymerizable material comprises a layer of photopolymerizable polymer-dispersed liquid crystal material.

17. The personal laser dosimeter according to claim 16, wherein the layer of photopolymerizable polymer-dispersed liquid crystal material comprises a homogeneous mixture of a monomer comprising primarily dipentaerythritol hydroxypentacrylate, a liquid crystal, a chain-extender monomer, a coinitiator, and a photoinitiator dye.

18. The personal laser dosimeter according to claim 16, wherein the layer of photopolymerizable polymer-dispersed liquid crystal material comprises a homogeneous mixture of a monomer comprising primarily dipentaerythritol hydroxypentacrylate, 10–40 wt % of the liquid crystal E7, chain-linking N-vinylpyrrolidone, coinitiator N-phenylglycine, and a photoinitiator dye.

19. The personal laser dosimeter according to claim 18, wherein the photoinitiator dye is rose bengal.

20. The personal laser dosimeter according to claim 16, wherein the prism is a Fresnel biprism.

* * * * *